(12) United States Patent
Mularcik (10) Patent No.: US 7,888,904 B2
(45) Date of Patent: Feb. 15, 2011

(54) VIRTUAL MOVING AIR GAP FOR AN AXIAL FLUX PERMANENT MAGNET MOTOR WITH DUAL STATORS

(75) Inventor: Bradley S. Mularcik, Copley, OH (US)

(73) Assignee: The Timken Company, Canton, OH (US)

(*) Notice: Subject to any disclaimer, the term of this patent is extended or adjusted under 35 U.S.C. 154(b) by 346 days.

(21) Appl. No.: 12/096,679

(22) PCT Filed: Jan. 26, 2007

(86) PCT No.: PCT/US2007/002000

§ 371 (c)(1),
(2), (4) Date: Jun. 9, 2008

(87) PCT Pub. No.: WO2007/089529

PCT Pub. Date: Aug. 9, 2007

(65) Prior Publication Data

US 2009/0160392 A1    Jun. 25, 2009

Related U.S. Application Data

(60) Provisional application No. 60/762,438, filed on Jan. 26, 2006, provisional application No. 60/788,934, filed on Apr. 4, 2006, provisional application No. 60/793,121, filed on Apr. 19, 2006, provisional application No. 60/747,878, filed on May 22, 2006.

(51) Int. Cl.
*H02P 25/18* (2006.01)
(52) U.S. Cl. ................. 318/724; 318/515; 318/720
(58) Field of Classification Search .......... 318/724, 318/515, 720; 310/156.35
See application file for complete search history.

(56) References Cited

U.S. PATENT DOCUMENTS 3,566,165 A    2/1971    Lohr (Continued)

FOREIGN PATENT DOCUMENTS

| EP | 1296443 A2 | 3/2003 |
|---|---|---|
| EP | 1414140 A1 | 4/2004 |
| WO | 03/084027 A1 | 10/2003 |

OTHER PUBLICATIONS

E. Nipp, "Alternative To Field-Weakening of Surface-Mounted Permanent-Mounted Motors For Variable-Speed Drivers", Royal Institute of Technology, EKC S-100 44 Stockholm, Sweden, IEEE 1995, pp. 191-198.

(Continued)

*Primary Examiner* — Walter Benson
*Assistant Examiner* — David S Luo
(74) *Attorney, Agent, or Firm* — Polster, Lieder, Woodruff & Lucchesi, L.C.

(57) ABSTRACT

An axial flux electric motor comprising a rotor and a first and second stator. The first and second stators have a first and second air gap located between the first and second stators and the rotor, respectively, and the second air gap is greater than the first gap. In one embodiment, the coils of the first stator and the coils of the second stator are in parallel. The motor further comprises switches which alternatingly energize the coils of the first stator and of the second stator based upon required torque and required speed of the motor. In a second embodiment, the coils of the first stator and the coils of the second stator are in series and the motor further comprises switches which selectively bypass the coils of the second stator in order to reduce the back EMF of the motor and increase the maximum speed of the motor at a given input voltage.

17 Claims, 6 Drawing Sheets

U.S. PATENT DOCUMENTS

| | | | |
|---|---|---|---|
| 4,135,118 A | | 1/1979 | Seeger et al. |
| 6,034,493 A | * | 3/2000 | Boyd et al. ............ 318/400.31 |
| 6,137,203 A | | 10/2000 | Jermakian et al. |
| 6,194,802 B1 | | 2/2001 | Rao |
| 6,348,751 B1 | | 2/2002 | Jermakian et al. |
| 6,392,905 B1 | | 5/2002 | Huang et al. |
| 6,879,129 B2 | * | 4/2005 | Tazawa et al. ............... 318/727 |
| 6,900,574 B2 | * | 5/2005 | Takemoto et al. ........ 310/254.1 |
| 6,922,004 B2 | * | 7/2005 | Hashimoto et al. .......... 310/268 |

OTHER PUBLICATIONS

International Written Opinion from corresponding International Application No. PCT/US2007/002000, mailed Sep. 21, 2007.

International Search Report from corresponding International Application No. PCT/US2007/002000, mailed Sep. 21, 2007.

* cited by examiner

FIG. 1

STATOR 1 HAS THE STANDARD AIR GAP.
STATOR 2 HAS THE LARGER AIR GAP.

INITIALLY BOTH STATORS SEE FULL CURRENT,
SW2 IS ON ALL THE TIME, AND SW1 IS OFF
ALL THE TIME.

AS THE BACK EMF GETS CLOSE TO THE LIMIT, THE
DUTY CYCLE OF SW1 IS INCREASED, AND THE DUTY
CYCLE OF SW2 IS DECREASED. THIS LOWERS THE
BEMF CONSTANT (Ke) AND THE TORQUE CONSTANT
(Kt).
THE DUTY CYCLE OF SW1 AND SW2 ARE ADJUSTED TO
KEEP THE BEMF BELOW THE MAXIMU ALLOWABLE LIMIT.

AS THE SPEED INCREASES, IT MAY BE NECESSARY FOR
SW1 TO BE ON 100% OF THE TIME, AND SW2 TO BE OFF
100% OF THE TIME. Ke AND Kt OF THE MOTOR WILL BE
THAT OF THE STATOR WITH THE LARGER AIR GAP.

VIRTUAL MOVING AIR GAP FOR AN AXIAL FLUX PERMANENT MAGNET MOTOR WITH DUAL STATORS

RELATED APPLICATIONS

The present application is the United States National Stage under 35 U.S.C. §371 of International Application Serial No. PCT/US2007/002000, having an International Filing Date of Jan. 26, 2007, and is related to and claims priority to U.S. Patent Application No. 60/762,438 filed Jan. 26, 2006, U.S. Patent Application No. 60/788,934 filed Apr. 4, 2006, U.S. Patent Application No. 60/793,121 filed Apr. 19, 2006, and U.S. Patent Application No. 60/747,878 filed May 22, 2006. The contents of each of said aforementioned applications are incorporated herein by reference.

TECHNICAL FIELD

The invention relates to electric motors. More specifically, the invention relates to a dual stator axial flux motor wherein the stators have air gaps that are unequal.

BACKGROUND ART

Permanent magnet motors have a trade off between having high torque at low speed and having a high speed range. Specifically, if the motor is built such that large amounts of low end torque are produced, the top speed of the motor is reduced. If a high top speed is required, this must come at the expense of low end torque.

For applications such as use in an electrically-powered automobile, it is desirable to have both high torque at low speed and a high top speed of the motor to avoid the necessity for a transmission assembly, which only increases cost and complexity, to increase the speed range of the motor and still provide enough torque to accelerate the automobile at an acceptable rate.

Several methods exist presently to address this limitation. However, all are based on reducing the flux density in the stator core. One method of reducing the flux density in the stator core is to vary the air gap between the rotor and stator to alter the flux density in the stator. This method requires complex mechanical assemblies that allow the rotor and stator to change position with respect to one another. For example, in an axial flux electric motor, a mechanical assembly would be required to physically move the rotor and stator laterally with respect to one another.

Another method of reducing flux density in the stator core is to introduce currents into the stator that create magnetic fields that oppose the magnetic fields of the permanent magnets on the stator. This has the obvious limitation of reducing the efficiency of the motor. In many applications, such as an electrically-powered automobile, this is unacceptable.

SUMMARY OF THE INVENTION

The present invention provides an axial flux electric motor comprising a rotor and a first and second stator. The first and second stators have a first and second air gap located between the first and second stators and the rotor, respectively, and the second air gap can be greater than the first gap. In one embodiment, the wiring of the first stator and the wiring of the second stator are in parallel. The motor further comprises switches which alternately energize the wiring of the first stator and the wiring of the second stator based upon required torque and required speed of the motor. In a second embodiment, the wiring of the first stator and the wiring of the second stator are in series and the motor further comprises switches which selectively bypass the wiring of the first stator in order to reduce the back EMF of the motor and increase the maximum speed of the motor at a given input voltage.

DESCRIPTION OF THE PREFERRED EMBODIMENT

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention comprises a method of constructing and controlling a dual stator axial flux motor. In one embodiment, the air gap of the rotor from one stator is relatively smaller than the air gap of the rotor to the second stator. The stators are driven alternately in order to give the motor both a wide speed range and a sufficient low speed torque. In another embodiment, the air gap of the rotor from one stator can be relatively smaller than the air gap of the rotor to the second stator, but can also be equal. The stator with the wider air gap is always driven but switches provide for bypassing of the stator with the narrower air gap based upon a duty cycle that increases to maintain a maximum limited back EMF of the motor.

Figure 1:
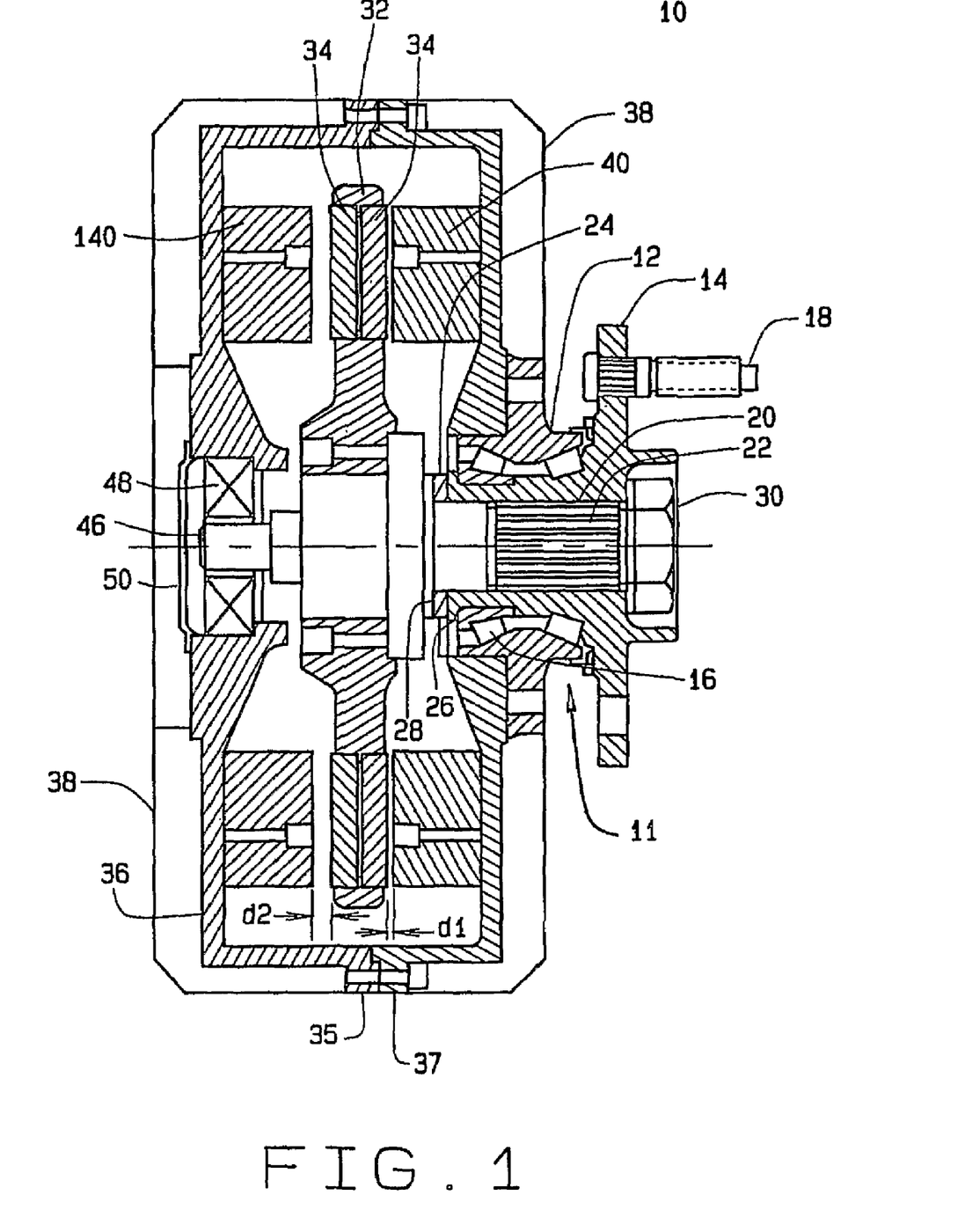
FIG. 1 is a side section view of a dual stator axial flux motor in accordance with a preferred embodiment of the present invention.

In that regard, a representative axial flux motor is described. However, it will be recognized by one of ordinary skill in the art that any axial flux motor can be used, and as such, the specific construction of the axial flux motor described is not a limitation of the present invention. Referring to FIG. 1, the assembly 10 comprises a package wheel bearing 11 of conventional design. The wheel bearing 11 comprises a housing 12 and a hub 14. Located between the housing 12 and the hub 14 are a plurality of rollers 16 that allow the hub 14 to rotate within the housing 12. The hub 14 may be attached to a wheel (not shown) with lugs 18.

The hub 14 further defines a splined interior bore 20 for accepting a splined shaft 22. An air gap washer 24 is located between an end 26 of the hub 14 and a shoulder 28 of the shaft 22. The thickness of the air gap washer 24 may be varied to adjust an air gap of the axial flux motor, further described below. The hub 14 is attached to the shaft 22 by a nut 30 and the mating splines of the hub 14 and the shaft 22 prevent relative rotation therebetween. Attached to the opposite end of the shaft 22 from the hub 14 is a rotor 32. The rotor 32 has several permanent magnets 34 attached to either side of the rotor 32. The magnets 34 are preferably neodymium-iron-boron (Nd—Fe—B) type permanent magnets and the number of magnets determines the number of poles of the motor (i.e. if twelve magnets are adhered to the rotor, the motor has twelve poles). The magnets 34 are attached to the rotor 32 with their north-seeking faces and south-seeking faces alternatingly outwardly arranged.

A case 36 is attached to the housing 12. The case 36 is preferably made from an aluminum alloy. The case 36 comprises two halves 35, 37 that completely encase the rotor 32, and the exterior of the case 36 further comprises cooling fins 38. Mounted within the case 36 are two stators 40, 140. As is known in the art, the stators 40 and 140 comprise a plurality of laminations. More specifically, the stators 40 and 140 comprises laminations of ferrous material, preferably iron, that are separated by non-conducting, non-ferrous layers to minimize losses due to eddy currents of magnetic flux within the stators 40 and 140. The stators 40 and 140 further comprise conductive windings comprising loops of insulated copper wire, as is known in the art.

The stator 40 is attached to the half 37 of the case 36, and the stator 140 is attached to the half 35 of the case 36. The shaft 22 includes an extension 46 that extends within a center bore of a resolver 48 mounted within one of the halves 35 of the case 36. The resolver 48 encodes the position of the shaft 22 for control circuitry (not shown) for the motor. A dust cover 50 is attached to the case 32 and covers the resolver 48.

Typically, in an axial flux motor with two stators, the rotor is set equidistant between the 2 stators, giving 2 identical air gaps and the stators are wired together either in series or in parallel depending on the desired motor performance.

In the present invention, however, the motor can be built with the rotor 32 closer to one stator 40 than the other stator 140. The distance of the stator 40 is referred to as d1 and the distance of the stator 140 is referred to as d2. The ratio of d1:d2 will determine the amount of increase in speed range that is possible. In an embodiment showing parallel wiring of the stators 40 and 140, d1 cannot equal d2 for any speed range increase to be realized. In the series-wired embodiment, a speed range increase is realized if d1=d2, but a greater speed range increase is possible if d1 does not equal d2.

The following equations show the relationship to the change in back EMF related to the change in the air gap. The following is the equation for back EMF (BEMF)

$$E_a = K_a * F * w_m$$

where $E_a$ is the BEMF, $K_a$ is the motor constant, F is the flux, and $w_m$ is the motor speed.

The following is the equation to determine the flux across the motor's air gap.

$$\phi_g = K_1 \phi = \frac{K_1}{1 + K_r \frac{\mu_R g A_m}{l_m A_g}} \phi_r$$

Where $F_g$ is the air gap flux and g is the air gap length.

These equations show that increasing the air gap length decreases the flux across the air gap, and therefore decreases the BEMF. Decreasing the motor's BEMF will allow the motor to be driven to a higher speed.

An EM analysis for a standard motor with several different length air gaps is shown in the table below. The standard air gap of 1.5 mm is used as a baseline.

| Gap mm | 1.5 | 3 | 5 | 10 |
|---|---|---|---|---|
| % of $K_e$ of original | 100% | 82% | 59% | 22% |

This table indicates that changing the air gap to 3 mm results in a BEMF constant ($K_e$) that is 82% of the original. At 5 mm, $K_e$ is 59% of the original, and 22% at 10 mm.

Figure 2:
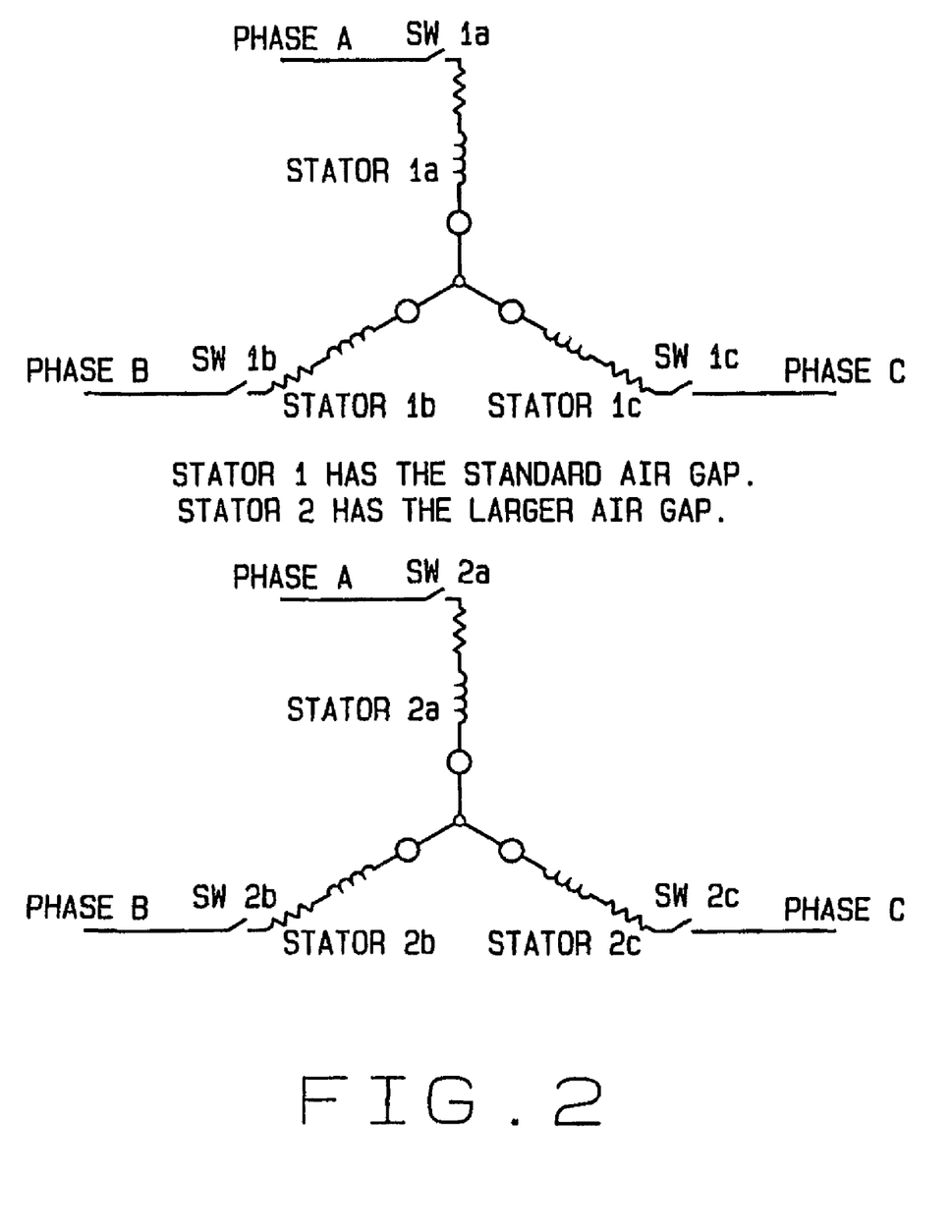
FIG. 2 is a wiring diagram for a dual stator axial flux motor in accordance with a first embodiment of the present invention.

In the first embodiment, the stators 40 and 140 are wired individually to the drive in a parallel configuration with a set of power electronic switches in series with each stator 40 and 140 as shown in FIG. 2.

As shown in FIG. 2, the SW1 and SW2 switches are always in opposite states. They can never be turned on at the same time. During the motor operation the SW1 and SW2 switches will be switched at high frequency in a pulse width modulation scheme. Thereby increasing the duty cycle to one will cause an equal decrease in duty cycle to the other.

The motor will start out with SW1 conducting 100% of the time, and SW2 conducting 0% of the time. This effect is that stator 140, with the larger air gap, is not even in the circuit. The torque and BEMF constants will be that of stator 40 only.

As the need for a wider speed range increases and the need to for low speed torque decreases, the duty cycle is changed such that SW2 is conducting for a greater percentage of the time causing stator 140, with the wider air gap, to provide more of the motor torque and stator 40 to begin providing less of the motor torque.

As the speed continues to increase above the region where constant torque is required, the duty cycle to SW1 and SW2 can be altered further in order to more heavily weight the effect of stator 140 and reduce the effect of stator 40, thereby reducing the BEMF of the motor.

Eventually, the duty cycle to SW1 is 0% while the duty cycle to SW2 is 100%. In this case, stator 40 is totally removed from the circuit, and the BEMF constant is that of stator 140 alone, which provides a lower BEMF and, therefore, higher speed.

It may be desirable to maintain the highest possible torque constant, while not exceeding the BEMF limit at any given speed. The duty cycle can be adjusted based on the BEMF relative to the desired BEMF limit.

This control method will have the effect of causing the dual stator motor to behave like two different single stator motors with a smooth seamless transition between them. It can also allow the motor to operate over some range of speeds with a constant BEMF. This "parallel" approach will also allow the motor controller to have a constant impedance load as the change in duty cycle transitions between stators.

In the case of a single stator motor, the BEMF constant $K_e$ is 251V/1000 RPM. This means in order to keep the BEMF below a limit of 380V, the max speed that can be achieved is 1500 RPM. If the method described above is applied with a d1 air gap of 1.5 mm and a d2 air gap of 5 mm, the maximum speed that can be reached is 2566 RPM. If the d2 air gap were 10 mm, then the maximum speed that can be reached is 6800 RPM.

The process described above causes a dual stator motor to have the low end torque of a single stator machine. It also extends the speed range of that motor.

Figure 3:
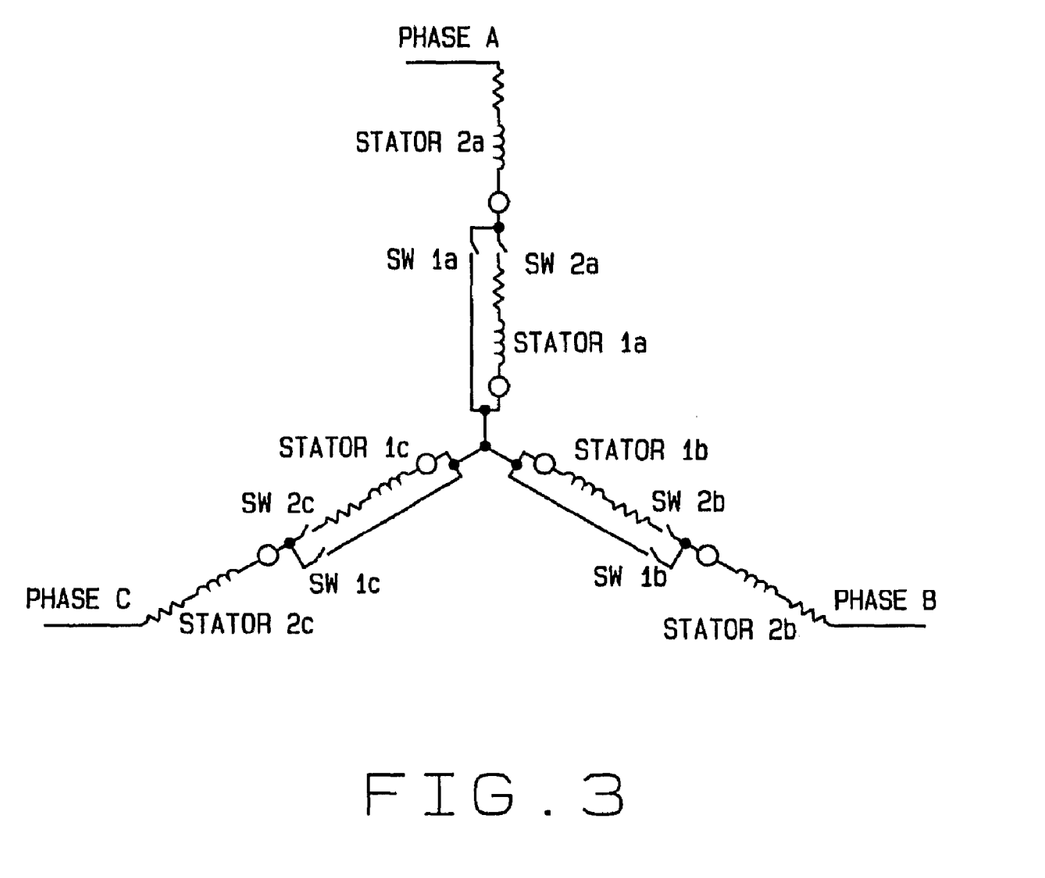
FIG. 3 is a wiring diagram for a dual stator axial flux motor in accordance with a second embodiment of the present invention.

In a second, preferred embodiment of the invention, the stators 40 and 140 are wired in series with power electronic switches to turn off and bypass one of the stators, as shown in FIG. 3.

In this method, each stator is wound with the maximum torque constant and BEMF constant that will yield full motor torque at the continuous rated current, assuming a standard air gap distance. This maximum winding will be done based on a half motor view. For example, if the maximum torque that can be produced by the machine is 700 NM, then each stator will be wound to produce 350 NM at rated current with a standard air gap. This will likely cause the BEMF constant to be high enough that desired full speed could not be obtained due to the limited bus voltage.

However, in this embodiment, one stator 40 is positioned with a standard air gap. The other stator 140 is positioned at an extended air gap. The BEMF constant of the stator 140 with the extended air gap is reduced by some percentage based on the distance of the air gap relative to the standard air gap. The BEMF constant of the stator 140 with the extended air gap should be such that when operating only on that stator, the motor can be run at the desired maximum speed, while not exceeding the desired upper limit of BEMF. This may be possible if stator 140 is positioned with an air gap equal to the air gap of stator 40.

The motor operation begins at zero speed with both stators 40 and 140 being fully utilized. SW1 is at a duty cycle of 0%, while SW2 is at 100%. As the motor speed increases, and the BEMF approaches the desired upper limit, the duty cycle of SW1 can be increased, while the duty cycle of SW2 is decreased. This ratio can be further adjusted as the motor speed increases so that the BEMF limit is maintained at a level below the desired BEMF limit.

Figure 4:
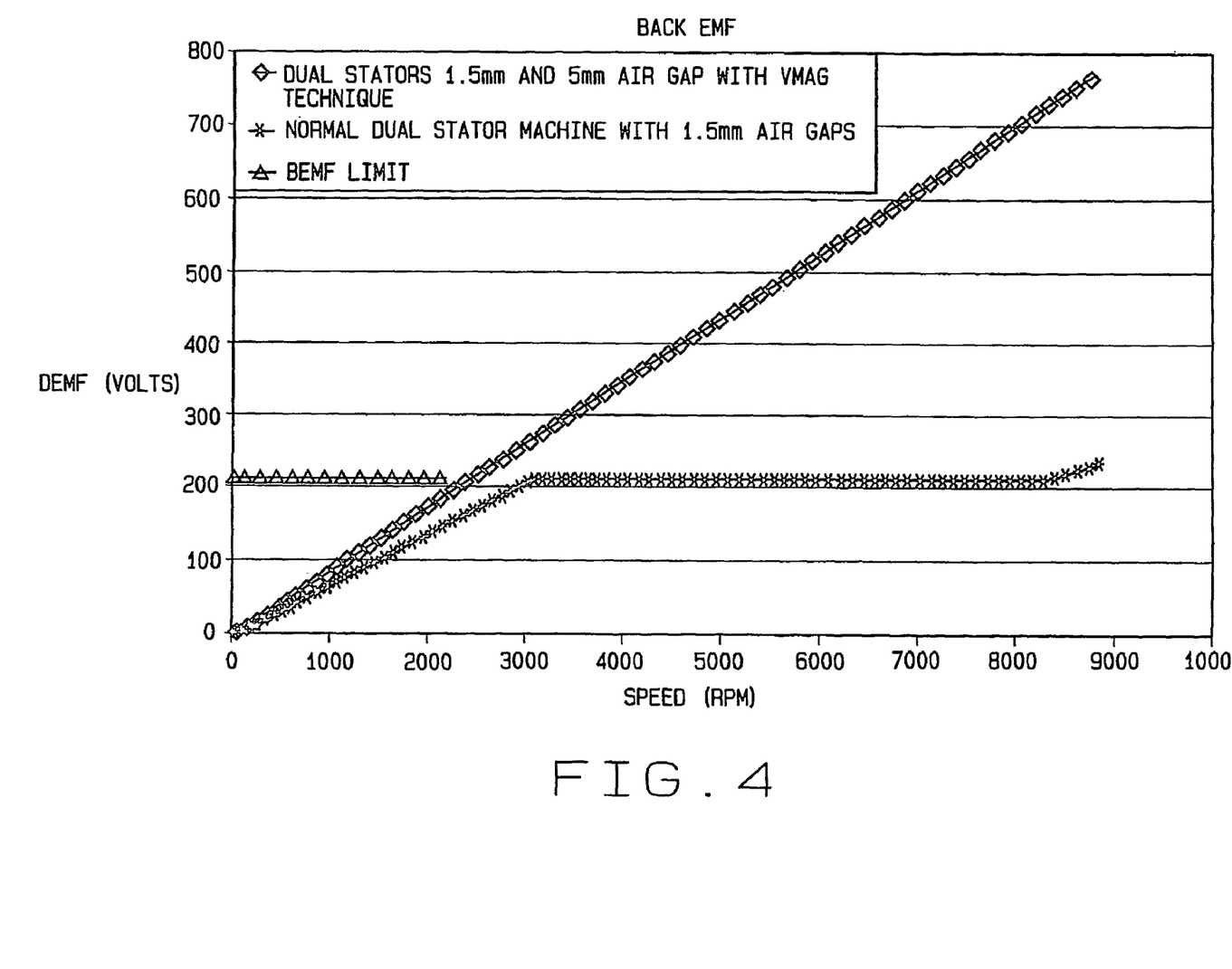
FIG. 4 is graph showing the back EMF of a prior art dual stator axial flux motor versus a motor according to the second embodiment of the present invention.

The graph of FIG. 4 shows the standard BEMF curve for the dual stators 40 and 140 where the BEMF increases linearly with speed. The second curve shows that the BEMF of the dual stators with different air gaps, when the amount of time that stator 40 is utilized is reduced with increased motor speed, remains constant. The effect as shown in the graph is that the BEMF is limited to a value equal to the desired BEMF limit, regardless of the increase in speed. If the speed were continued to be increased, there would be a point where SW1 was on all of the time. At this point, the BEMF constant would again be linear, and the BEMF would again rise linearly with any further increase in speed.

Figure 5:
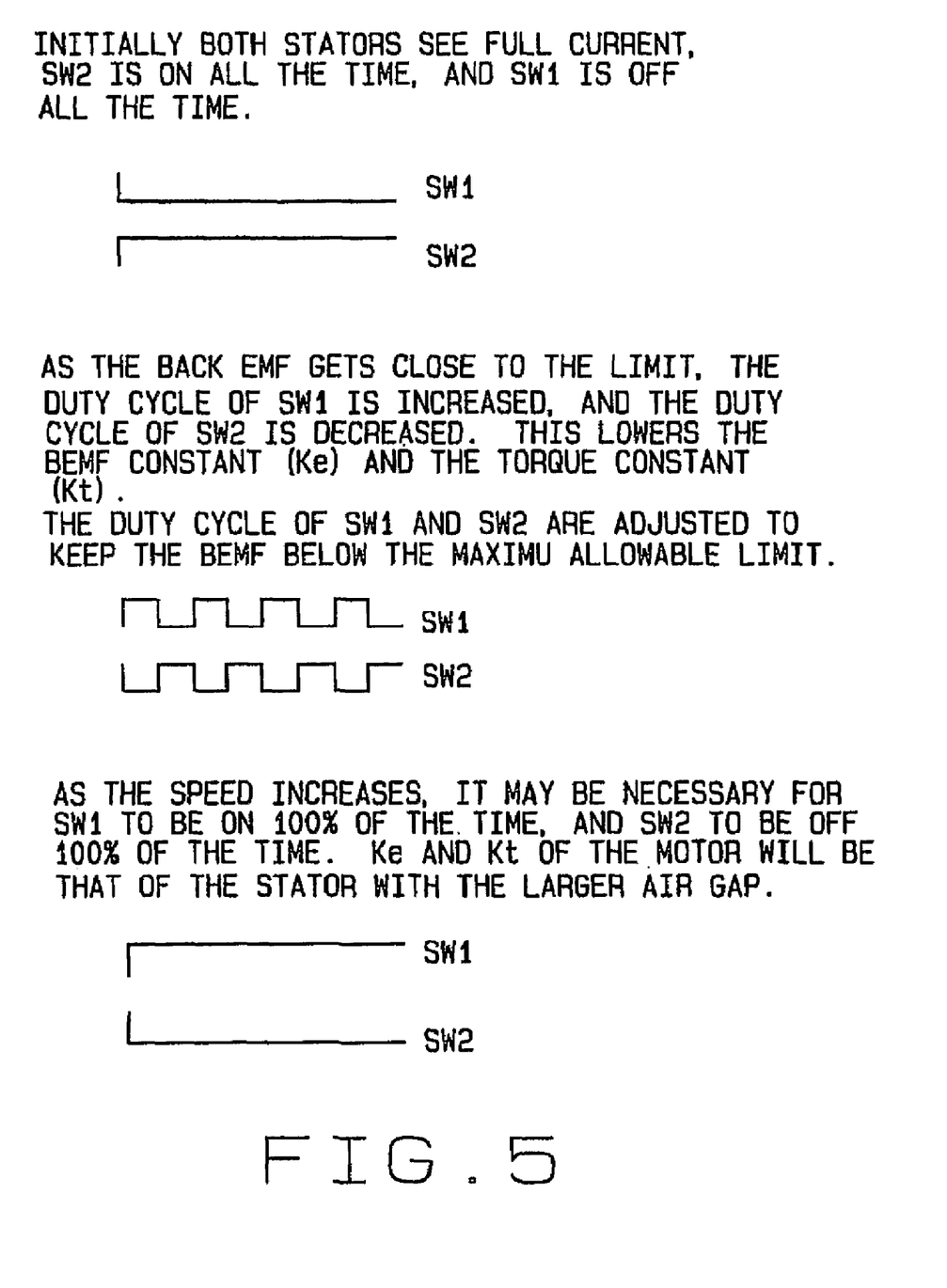
FIG. 5 is a timing diagram of the switches controlling energization of the wiring of the stators according to the second embodiment of the present invention.

The operation of the switches is performed based on the timing diagrams provided in FIG. 5.

It is also important to note that the PWM method described in this preferred embodiment can be applied to a dual stator axial flux motor with series stators as described in this preferred embodiment where both air gaps are equal. Having equal air gaps allows the method to be applied to any dual series stator axial flux motor. The speed range increase achieved by applying the method to motor with equal air gaps is not quite as great, but there is zero loss in low speed torque by using a motor with equal air gaps.

In a third embodiment of the invention, the stators 40 and 140 are wired in series with power electronic switches to turn off and bypass one of the stators, as shown in FIG. 3.

In this method, each stator is wound with the maximum torque constant and BEMF constant that will yield full motor torque at the continuous rated current, assuming a standard air gap distance. This maximum winding will be done based on a half motor view. For example, if the maximum torque that can be produced by the machine is 700 NM, then each stator will be wound to produce 350 NM at rated current with a standard air gap. This will likely cause the BEMF constant to be high enough that desired full speed could not be obtained due to the limited bus voltage.

However, in this embodiment, one stator 40 is positioned with a standard air gap. The other stator 140 is positioned at an extended air gap. The BEMF constant of the stator 140 with the extended air gap is reduced by some percentage based on the distance of the air gap relative to the standard air gap. The BEMF constant of the stator 140 with the extended air gap should be such that when operating only on that stator, the motor can be run at the desired maximum speed, while not exceeding the desired upper limit of BEMF. This may be possible if stator 140 is positioned with an air gap equal to the air gap of stator 40.

Figure 6:
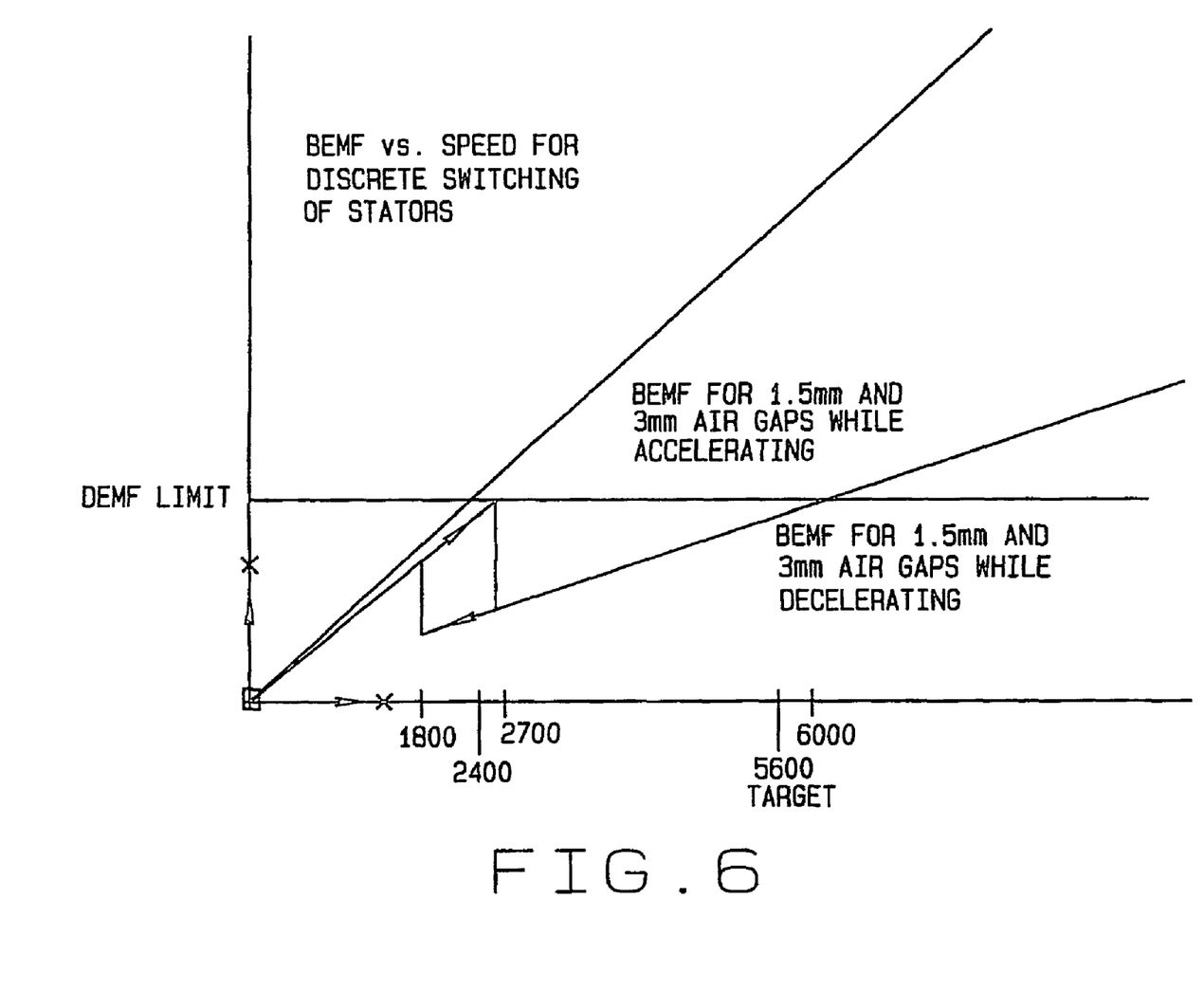
FIG. 6 is a chart showing back EMF versus speed for discrete switching of stators according to a third embodiment of the present invention.

The motor operation begins at zero speed with both stators 40 and 140 being fully utilized—SW1 off while SW2 is on. As the motor speed increases, and the BEMF approaches the desired upper limit, the SW1 can be turned on while SW2 is turned off. This will cause an instant reduction in torque constant and BEMF constant, as shown in FIG. 6. Further increase in speed will cause the BEMF to again increase toward the BEMF limit, but at a reduced slope. The motor drive (inverter) will compensate for the drop in torque constant by increasing the current needed to maintain the commanded torque. The transition speed is different based on whether the motor is accelerating or decelerating to prevent oscillation between running on one stator and running on both stators as shown in FIG. 6.

While the specific embodiments have been illustrated and described, numerous modifications come to mind without significantly departing from the spirit of the invention, and the scope of protection is only limited by the scope of the accompanying claims.

The invention claimed is:

1. An axial flux electric motor and control comprising:
   a rotor having a plurality of magnets mounted thereto;
   a first stator displaced from said rotor by a first air gap, said first stator having a plurality of slots defined therein, the slots wound with electrical wiring to generate a magnetic field when the wiring is energized with current;
   a second stator displaced by a second air gap on an opposite side of said rotor from the first stator, said second stator having a plurality of slots defined therein, the slots further wound with electrical wiring to generate a magnetic field when the wiring is energized with current;
   a motor control adapted to regulate a flow of power to the first and second stator wirings using high-frequency pulse width modulated inversely proportional duty cycles whereby said motor has a first torque, operational speed, and BEMF value when driven solely by said first stator, and whereby said motor has a second torque, operational speed, and BEMF value when driven solely by said second stator;
   wherein said first and second stators are electrically wired in a parallel configuration; and
   wherein the first stator has a greater duty cycle during low speed operation of the motor and the second stator has a greater duty cycle when the motor is operating at a relatively higher speed.

2. The axial flux electric motor and control of claim 1 wherein the duty cycles of the power flow applied to the first and second stators are inversely proportional.

3. An axial flux electric motor and control comprising:
   a rotor having a plurality of magnets mounted thereto;
   a first stator displaced from said rotor by a first air gap, said first stator having a plurality of slots defined therein, the slots wound with electrical wiring to generate a magnetic field when the wiring is energized with current;

a second stator displaced by a second air gap on an opposite side of said rotor from the first stator, said second stator having a plurality of slots defined therein, the slots further wound with electrical wiring to generate a magnetic field when the wiring is energized with current;

a motor control adapted to regulate a flow of power to the first and second stator wirings using high-frequency pulse width modulated inversely proportional duty cycles whereby said motor has a first torque, operational speed, and BEMF value when driven solely by said first stator, and whereby said motor has a second torque, operational speed, and BEMF value when driven solely by said second stator;

wherein said first and second stators are electrically wired in a series configuration; and wherein said motor control is further adapted to direct said flow of power to bypass said second stator to maintain a selected BEMF value at an increased motor operational speed.

4. The axial flux electric motor and control of claim 3 wherein the motor control is adapted to prevent the BEMF of the motor from increasing beyond a maximum limit as the motor speed increases.

5. The axial flux electric motor and control of claim 3 wherein said second air gap is smaller than said first air gap, and wherein said motor control includes switches operationally configured to enable the flow of power to bypass the second stator winding.

6. The axial flux electric motor and control of claim 5 wherein said motor control is configured to operate said switches with Pulse Width Modulation and wherein the duty cycle of the switches is varied in order to control the BEMF of the motor.

7. The axial flux electric motor and control of claim 5 wherein the motor control is configured to compensate for changing motor characteristics during the operation of the switches that are bypassing the second stator.

8. An axial flux electric motor and control comprising:

a rotor having a plurality of magnets mounted thereto;

a first stator displaced from said rotor by a first air gap, said first stator having a plurality of slots defined therein, the slots wound with electrical wiring to generate a magnetic field when the wiring is energized with current;

a second stator displaced by a second air gap on an opposite side of said rotor from the first stator, said second stator having a plurality of slots defined therein, the slots further wound with electrical wiring to generate a magnetic field when the wiring is energized with current;

a motor control adapted to regulate a flow of power to the first and second stator wirings using high-frequency pulse width modulated inversely proportional duty cycles whereby said motor has a first torque, operational speed, and BEMF value when driven solely by said first stator, and whereby said motor has a second torque, operational speed, and BEMF value when driven solely by said second stator; and wherein said motor control is configured to regulate said flow of power to said first and second stator wirings to maintain a selected BEMF value at an associated motor operational speed.

9. The motor of claim 8 wherein the first and second air gaps are not equal.

10. The axial flux electric motor of claim 8 wherein the first and second air gaps are equal.

11. The axial flux electric motor and control of claim 8 wherein said first and second stators are electrically wired in a parallel configuration.

12. The axial flux electric motor and control of claim 8 wherein said flow of power to said first stator regulated by said motor control is inversely proportional to a flow of power to said second stator.

13. The axial flux electric motor and control of claim 8 wherein said first and second stators are electrically wired in a series configuration.

14. A method for controlling a flow of power within an axial flux electric motor having a motor control configured to regulate a flow of power to electrical windings of a first stator displaced from a rotor by a first air gap, and to regulate a flow of power to the electrical windings of a second stator displaced by a air second gap from the opposite side of the rotor from the first stator, comprising:

selectively switching said regulated flow of power to between said windings of said first stator and said second stator; and wherein said regulated flow of electrical power is selectively switched between said windings of said first stator and said windings of said second stator to achieve a selected motor operational speed, speed range, and torque output.

15. The method of claim 14 wherein said regulated flow of electrical power is selectively switched between said windings of said first and second stators at a duty cycle required to maintain a motor BEMF value below a selected maximum BEMF value for an associated operational speed of the motor.

16. The method of claim 14 wherein said regulated flow of electrical power is selectively switched such that a flow of power provided to said windings of said first stator is inversely proportional to a flow of power provided to said windings of said second stator.

17. The method of claim 14 further including the step of assembling the axial flux electric motor such that the displacement of said first air gap differs from the displacement of said second air gap, said first air gap displacement selected for said motor to achieve a desired torque output and BEMF value when 100% of said regulated flow of power is switched to the windings of said first stator, and wherein said second air gap displacement is selected for said motor to achieve a desired operational speed and BEMF value when 100% of said regulated flow of power is switched to the windings of said second stator.

* * * * *